United States Patent
Holman

(10) Patent No.: US 11,686,835 B2
(45) Date of Patent: Jun. 27, 2023

(54) POSITIONED ENHANCED SENSOR DETECTION

(71) Applicant: Tactual Labs Co., New York, NY (US)

(72) Inventor: David Holman, Toronto (CA)

(73) Assignee: Tactual Labs Co., New York, NY (US)

( * ) Notice: Subject to any disclaimer, the term of this patent is extended or adjusted under 35 U.S.C. 154(b) by 220 days.

(21) Appl. No.: 16/910,982

(22) Filed: Jun. 24, 2020

(65) Prior Publication Data

US 2020/0408895 A1  Dec. 31, 2020

Related U.S. Application Data

(60) Provisional application No. 62/866,324, filed on Jun. 25, 2019.

(51) Int. Cl.
| G01S 13/50 | (2006.01) |
| H01Q 1/27 | (2006.01) |
| G06F 3/01 | (2006.01) |

(52) U.S. Cl.
CPC .............. *G01S 13/50* (2013.01); *G06F 3/014* (2013.01); *H01Q 1/273* (2013.01)

(58) Field of Classification Search
CPC ... A61B 5/1126; A61B 5/1107; A61B 5/1125; A61B 5/7228; A61B 5/681; A61B 5/7257; A61B 5/1123; G01H 11/08; G01S 13/50; G01S 7/356; G06F 3/014; G06F 3/0481; G06F 3/04812; G06F 3/017; G06F 3/04142; G06F 3/0488; G06F 2200/1637; G06F 1/163; G06F 1/1694; H01Q 1/273
See application file for complete search history.

(56) References Cited

U.S. PATENT DOCUMENTS

| 2015/0091790 A1* | 4/2015 | Forutanpour | G06F 3/011 345/156 |
| 2015/0215443 A1* | 7/2015 | Heo | H04M 1/05 455/556.1 |
| 2020/0111260 A1* | 4/2020 | Osborn | G06T 19/006 |

* cited by examiner

*Primary Examiner* — Phuong H Nguyen
(74) *Attorney, Agent, or Firm* — Adam Landa

(57) ABSTRACT

A sensing system has transmitting antennas and receiving antennas. The placement of the sensing system is adapted to enhance the sensing system's ability to process the signals so as to provide information regarding the touch between fingertips, the pinching of fingers and the touching of objects.

20 Claims, 6 Drawing Sheets

POSITIONED ENHANCED SENSOR DETECTION

This application claims the benefit of U.S. Provisional Application No. 62/866,324 filed Jun. 25, 2019, the contents of which are incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and method relate to the field of sensors, in particular the disclosed apparatus and method relate to gesture and human interaction sensors.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
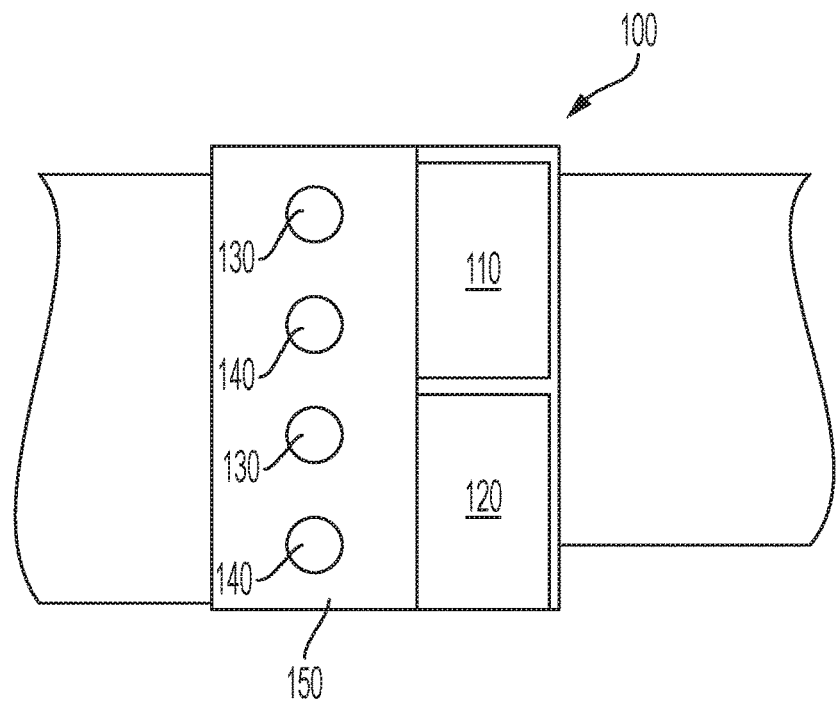
FIG. 1 shows a diagram of a sensing system.

The present application contemplates an improved sensing system implementing fast multi-touch sensing (FMT) chips. FMT chips are suited for use with frequency orthogonal signaling techniques (see, e.g., U.S. Pat. Nos. 9,019,224 and 9,529,476, and 9,811,214, all of which are hereby incorporated herein by reference). The sensor configurations discussed herein may be used with other signal techniques including scanning or time division techniques, and/or code division techniques. It is pertinent to note that the sensors described and illustrated herein are also suitable for use in connection with signal infusion (also referred to as signal injection) techniques and apparatuses.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

The application employs principles used in fast multi-touch sensors and other interfaces disclosed in the following: U.S. Pat. Nos. 9,933,880; 9,019,224; 9,529,476; 9,811,214; 9,804,721; 9,710,113; and 9,158,411. Familiarity with the disclosure, concepts and nomenclature within these patents is presumed. The entire disclosures of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency orthogonal to each other, in which case, they could not be the same frequency.

Certain principles of a fast multi-touch (FMT) sensor have been disclosed in the patent applications discussed above. Orthogonal signals may be transmitted into a plurality of transmitting antennas (or conductors) and information may be received by receivers attached to a plurality of receiving antennas (or conductors). In an embodiment, receivers "sample" the signal present on the receiving antennas (or conductors) during a sampling period ($\tau$). In an embodiment, signal (e.g., the sampled signal) is then analyzed by a signal processor to identify touch events (including, e.g., actual touch, near touch, hover and farther away events that cause a change in coupling between a transmitting antenna (or conductor) and receiving antennas (or conductor)). In an embodiment, one or more transmitting antennas (or conductors) can move with respect to one or more receiving antennas (or conductors), and such movement causes a change of coupling between at least one of the transmitting antennas (or conductors) and at least one of the receiving antennas (or conductors). In an embodiment, one or more transmitting antennas (or conductors) are relatively fixed with respect to one or more receiving antennas (or conductors), and the interaction of the signal and/or signals transmitted with environmental factors causes a change of coupling between at least one of the transmitting antennas (or conductors) and at least one of the receiving antennas (or conductors). The transmitting antennas (or conductors) and receiving antennas (or conductors) may be organized in a variety of configurations, including, e.g., a matrix where the crossing points form nodes, and interactions are detected by processing of received signals. In an embodiment where the orthogonal signals are frequency orthogonal, spacing between the orthogonal frequencies, $\Delta f$, is at least the reciprocal of the measurement period $\tau$, the measurement period $\tau$ being equal to the period during which the column conductors are sampled. Thus, in an embodiment, the received at a column conductor may be measured for one millisecond ($\tau$) using frequency spacing ($\Delta f$) of one kilohertz (i.e., $\Delta f = 1/\tau$).

In an embodiment, the signal processor of a mixed signal integrated circuit (or a downstream component or software) is adapted to determine at least one value representing each frequency orthogonal signal transmitted to (or present on) a row conductor (or antenna). In an embodiment, the signal processor of the mixed signal integrated circuit (or a downstream component or software) performs a Fourier transform on the signals present on a receive antenna (or conductor). In an embodiment, the mixed signal integrated circuit is adapted to digitize received signals. In an embodiment, the mixed signal integrated circuit (or a downstream component or software) is adapted to digitize the signals present on the receive conductor or antenna and perform a discrete Fourier transform (DFT) on the digitized information. In an embodiment, the mixed signal integrated circuit (or a downstream component or software) is adapted to digitize the signals present on the received conductor or antenna and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as the term frequency orthogonal is used herein, two signals are considered frequency orthogonal if substantially all of the contribution of one signal to the DFT bins is made to different DFT bins than substantially all of the contribution of the other signal.

When sampling, in an embodiment, received signals are sampled at at least 1 MHz. In an embodiment, received signals are sampled at at least 2 MHz. In an embodiment, received signals are sampled at at least 4 Mhz. In an embodiment, received signals are sampled at 4.096 Mhz. In an embodiment, received signals are sampled at more than 4 MHz. To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmitting antenna. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency orthogonal signal that is transmitted. In an embodiment, each DFT (which can be an FFT) bin comprises an in-phase (I) and quadrature (Q) component. In an embodiment, the sum of the squares of the I and Q components is used as measures corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to activity, touch events, etc. In other words, the measure corresponding to signal strength in a given bin would change as a result of some activity proximate to the sensors, such as a touch event.

The sensing apparatuses discussed herein use transmitting and receiving antennas (also referred to herein as conductors, row conductors, column conductors, transmitting conductors, or receiving conductors). However, it should be understood that whether the transmitting antennas or receiving antennas are functioning as a transmitter, a receiver, or both depends on context and the embodiment. In an embodiment, the transmitters and receivers for all or any combination of the arrangements are operatively connected to a single integrated circuit capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a GPU and software for signal processing.

In an embodiment, the mixed signal integrated circuit is adapted to generate one or more signals and send the signals to the transmitting antennas via the transmitter. In an embodiment, the mixed signal integrated circuit is adapted to generate a plurality of frequency orthogonal signals and send the plurality of frequency orthogonal signals to the transmitting antennas. In an embodiment, the mixed signal integrated circuit is adapted to generate a plurality of frequency orthogonal signals and one or more of the plurality of frequency orthogonal signals to each of a plurality of transmit antennas. In an embodiment, the frequency orthogonal signals are in the range from DC up to about 2.5 GHz. In an embodiment, the frequency orthogonal signals are in the range from DC up to about 1.6 MHz. In an embodiment, the frequency orthogonal signals are in the range from 50 KHz to 200 KHz. The frequency spacing between the frequency orthogonal signals should be greater than or equal to the reciprocal of the integration period (i.e., the sampling period).

In an embodiment, the mixed signal integrated circuit (or a downstream component or software) is adapted to determine at least one value representing each frequency orthogonal signal transmitted by a transmitting antenna. In an embodiment, the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information.

Turning to FIG. 1, a simplified diagram is shown that sets forth an example of a sensing system 100, which is incorporated into wearable 150. In FIG. 1, the wearable 150 is placed on a wrist. In an embodiment, a mixed signal integrated circuit with signal processing capabilities comprises a transmitter 110, and a receiver 120. In an embodiment, an analog front end comprising a transmitter (or multiple transmitters) and a receiver (or multiple receivers) is used to send and receive signals instead of the mixed signal integrated circuit. In such an embodiment, the analog front end provides a digital interface to signal generating and signal processing circuits and/or software. In an embodiment, the mixed signal integrated circuit is adapted to generate one or more signals and send the signals to the transmitting antenna 130 (also referred to as an electrode or conductor) via the transmitter 110. In an embodiment, the mixed signal integrated circuit 100 is adapted to generate a plurality of frequency-orthogonal signals and send the plurality of frequency-orthogonal signals to the transmitting antennas 130.

The transmitter 110 is conductively coupled to transmitting antennas 130, and the receiver 120 is operably connected to receiving antennas 140 (also referred to herein as conductors or electrodes). The transmitting antenna 130 is supported on the wearable 150 that is worn on a body part. It will be apparent to a person of skill in the art in view of this disclosure that the transmitting antennas and receiving antennas are arbitrarily assigned, and the transmitting antenna 130 can be used on the receive side, while the receiving antenna 140 can be used as the transmit side. It will also be apparent to a person of skill in the art in view of this disclosure that signal processor, transmitter and receiver may be implemented on separate circuits. It will be apparent to a person of skill in the art in view of this disclosure that the transmitter and receivers may support more than one antenna. In an embodiment, a plurality of transmitting antennas 130 and/or a plurality of receiving antennas 140 are employed.

Further discussion regarding the implementation of the transmitting antennas (or conductors) and receiving antennas (or conductors) in association with wearables can be found in U.S. patent application Ser. No. 15/926,478, U.S. patent application Ser. No. 15/904,953, U.S. patent application Ser. No. 16/383,090 and U.S. patent application Ser. No. 16/383,996, the contents of all of the aforementioned applications incorporated herein by reference.

Figure 2:
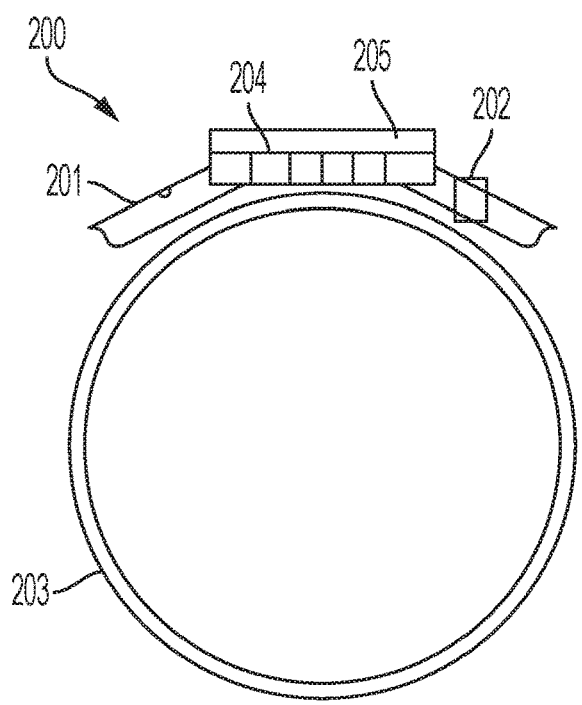
FIG. 2 is another diagram of a sensing system adapted to determine activity.

FIG. 2 is a diagram showing an embodiment of a sensing system 200 located proximate to a wrist area 203. Sensing system 200 is operably attached to a body at a location where information regarding the activity of a particular muscle or muscle grouping is able to be determined. In FIG. 2, sensing system 200 is connected to the wrist area 203 via the use of a band 201. In the arrangement depicted in FIG. 2 the activity of muscles that control motion of the hand are able to be detected. However, it should be understood, and, as discussed below, sensing systems may be operably connected to other parts of the body and/or operably connected to the body using mechanisms other than bands. The sensing system 200 comprises receiving antennas 204 (antennas are also referred to as conductors or electrodes) that are operably connected to a processor (not shown). The receiving antennas 204 are located within a housing 205. The housing 205 is operably attached to the band 201.

When the sensing system 200 is worn, the receiving antennas 204 are adapted to be located above the surface of the skin of the wrist area 203. In the embodiment, shown in FIG. 2, each of the receiving antennas 204 are located at substantially the same distance from the surface of the wrist area 203 in a direction normal to the surface of the wrist area 203. The receiving antennas 204 may be separated from the surface of the wrist area 203 by material formed from the housing 205. In an embodiment, the band 201 separates the receiving antennas 204 from the surface of the wrist area 203. In an embodiment, a layer of material other than the band separates the receiving antennas from the surface of the skin. In an embodiment, a housing separates the receiving antenna or receiving antennas from the surface of the skin. In an embodiment, multiple layers of material separate the receiving antenna or receiving antennas from the surface of the skin. In an embodiment, a receiving antenna or receiving antennas are placed proximate to the surface of the skin without any intervening layers. In an embodiment, a receiving antenna or receiving antennas are placed on the surface of the skin.

When receiving antennas 204 are located distally from the surface of the skin there is less likelihood of factors such as sweat, skin chemistry, texture, biological factors, etc. from interfering with the measurements. In an embodiment, the receiving antennas 204 are adapted to be positioned about 2 mm from the surface of the skin. In an embodiment, the receiving antennas 204 are adapted to be positioned about 1 mm from the surface of the skin. In an embodiment, the receiving antennas 204 are adapted to be positioned about 3 mm from the surface of the skin. In an embodiment, the receiving antennas 204 are adapted to be positioned about 4 mm from the surface of the skin. In an embodiment, the receiving antennas 204 are adapted to be positioned about 5 mm from the surface of the skin. In an embodiment, some receiving antennas are positioned at different distances from the surface of the skin. For example, one grouping of receiving antennas is positioned at 1 mm from the surface of the skin, while another grouping of receiving antennas is positioned at 2 mm from the surface of the skin. In an embodiment, each of the receiving antennas are positioned at a different distance from the surface of the skin. Generally, as the receiving antennas 204 approach, or are located in proximity to the surface of the skin, the magnitude of the infused signal received from the skin increases. Other factors that impact the reception of infused signal by the receiving antennas are the geometry of the receiving antennas and size of the receiving antennas.

The sensing system 200 also comprises transmitting antenna 202 (also referred to as a conductor or electrode). While a single transmitting antenna 202 is shown, more than one transmitting antenna may be used in the sensing system 200. More transmitting antennas can provide additional sources of signal that when measured and processed can provide additional information regarding the activity of muscles. The transmitting antenna 202 is adapted to infuse a signal into the user of the sensing system 200. The transmitting antenna 202 is operably connected to the band 201 and is located sufficiently proximate to the user so as to effectively transmit signal into the user so that the signal is able to be carried by the user. In an embodiment, the band 201 separates the transmitting antenna 202 from the surface of the wrist area 203. In an embodiment, a layer of material other than the band separates a transmitting antenna or transmitting antennas from the surface of the skin. In an embodiment, a housing separates the transmitting antenna or transmitting antennas from the surface of the skin. In an embodiment, multiple layers of material separate a transmitting antenna or transmitting antennas from the surface of the skin. In an embodiment, a transmitting antenna or transmitting antennas are placed proximate to the surface of the skin without any intervening layers. In an embodiment, a transmitting antenna or transmitting antennas are placed on the surface of the skin. The distance of the transmitting antenna from the surface of the skin or whether the transmitting antenna is located on the skin may be determined by factors such as signal strength and body chemistry.

In FIG. 2, the transmitting antenna 202 is shown located distally from the receiving antennas 204, however it should be understood that the transmitting antenna 202 may be located at various distances from the respective receiving antennas 202. The proximity of the transmitting antenna 202 to a receiving antenna 204 may impact the measurements of the signal received by the receiving antennas 204. It should also be understood that the roles of the transmitting antenna and the receiving antennas may switch or alternate in some embodiments, with the transmitting antenna functioning as receiving antenna and the receiving antennas functioning as transmitting antennas.

In FIG. 2, a transmitting antenna 202 is shown that infuses a signal to a user of the sensing system 200. In an embodiment, more than one transmitting antenna infuses signals to a user. In an embodiment, more than one transmitting antenna infuses signals to a user wherein each of the transmitting antennas infuses a signal that is orthogonal from each other signal transmitted to the user. In an embodiment, one transmitting antenna infuses more than one signal to a user wherein each of the signals transmitted to the user is orthogonal with respect to each other signal transmitted to the user. By using more transmitted signals potentially more information regarding the location being measured can be obtained.

While the transmitting antenna 202 is shown located on the band 203, it should be understood that the transmitting antenna 202 does not have to be located on the band 203 or necessarily proximate to the band 201. In an embodiment the transmitting antenna or antennas are located on a wearable located elsewhere on the body. In an embodiment, the transmitting antenna or antennas are located proximate to another hand of the user. In an embodiment the transmitting antenna or antennas are located on a ring worn by the user. In an embodiment the transmitting antenna or antennas are located on goggles or glasses located on the head. In an embodiment the transmitting antenna or antennas are located in an article of clothing worn by the user. In an embodiment the transmitting antenna or antennas are located on a token carried by the user.

In an embodiment, the transmitting antenna or antennas are located within the environment and signal is transmitted to the user upon being proximate to the transmitting antenna. In an embodiment, the transmitting antenna or antennas are located in a chair in which the user sits. In an embodiment, the transmitting antenna or antennas are located on the floor on which the user stands. In an embodiment, the transmitting antenna or antennas are located within a vehicle.

In FIG. 2 the geometry is set forth so that there is one transmitting antenna 202 and a plurality of receiving antennas 204. In an embodiment, the roles of the transmitting antenna and receiving antennas may be reversed or alternated. In an embodiment, a receiving antenna or receiving antennas are switched to perform the role of a transmitting antenna or transmitting antennas and the transmitting antenna or transmitting antennas are switched to perform the role of a receiving antenna or receiving antennas. By alternating roles of the antennas additional and different information may be obtained.

While the embodiment shown and described in FIGS. 1 and 2 have been able to determine and distinguish movement and position of the fingers. Various rates of success with respect to the ability of the sensing system to determine certain touch events has been noticed with respect to touch events such as pinch and determining when fingertips meet. However, the placement of the sensing system with respect to the wrist area has been able to enhance the ability of the sensing system to be able to distinguish these types of events. By placing the sensing system in a location where enhanced data with respect to the movement of the wrist and movement of the fingers reflected within the area of the wrist are able to be determined such events can be detected. By correlating certain events with the determined activity within the wrist area, events such as touch, pinch and the touching of objects can be discerned. Furthermore, via the usage of machine learning the ability of touch events can be enhanced as more correlating events are ascribed to the usage of the system.

Figure 3:
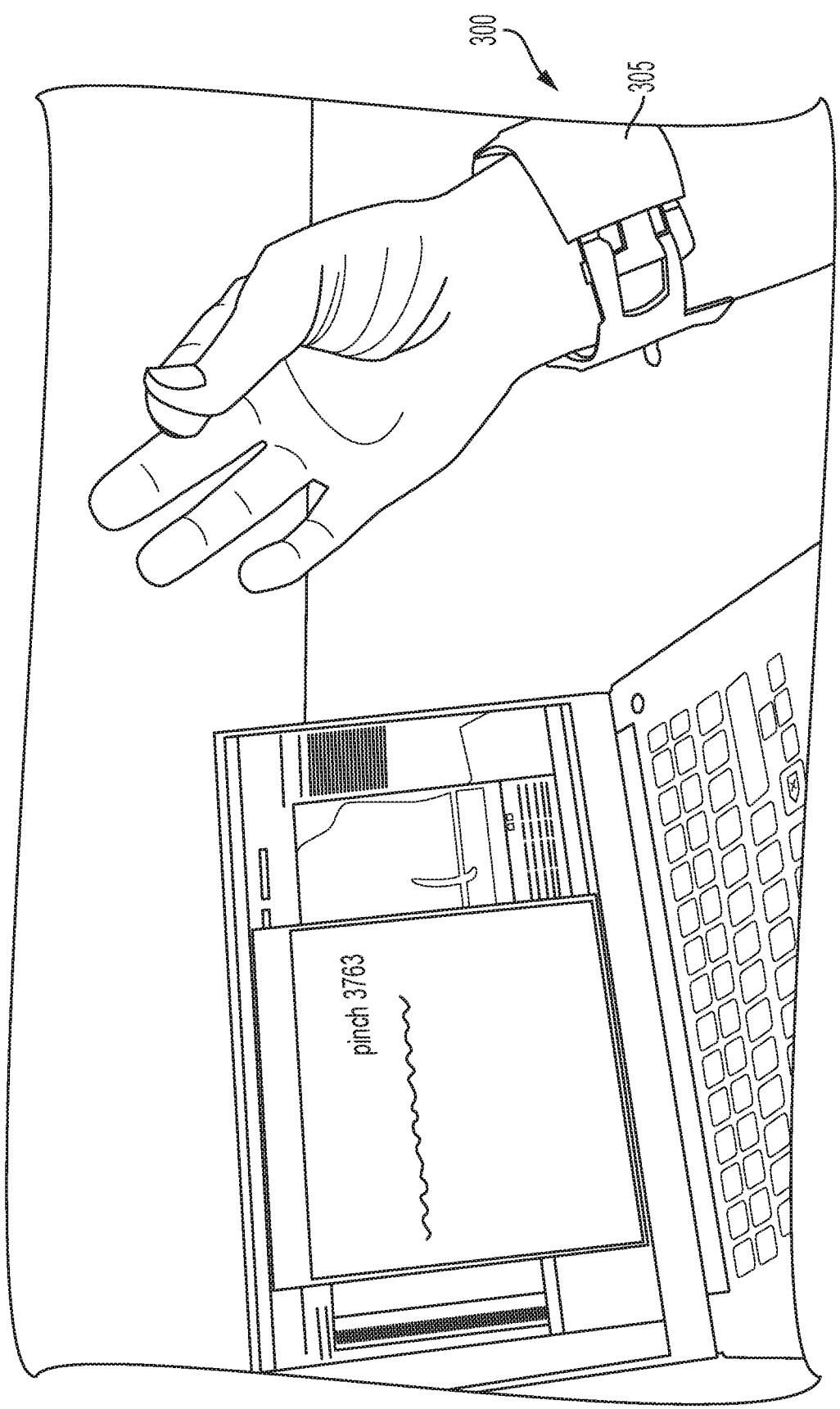
FIG. 3 shows a pinch being determined by a sensing system.
Figure 4:
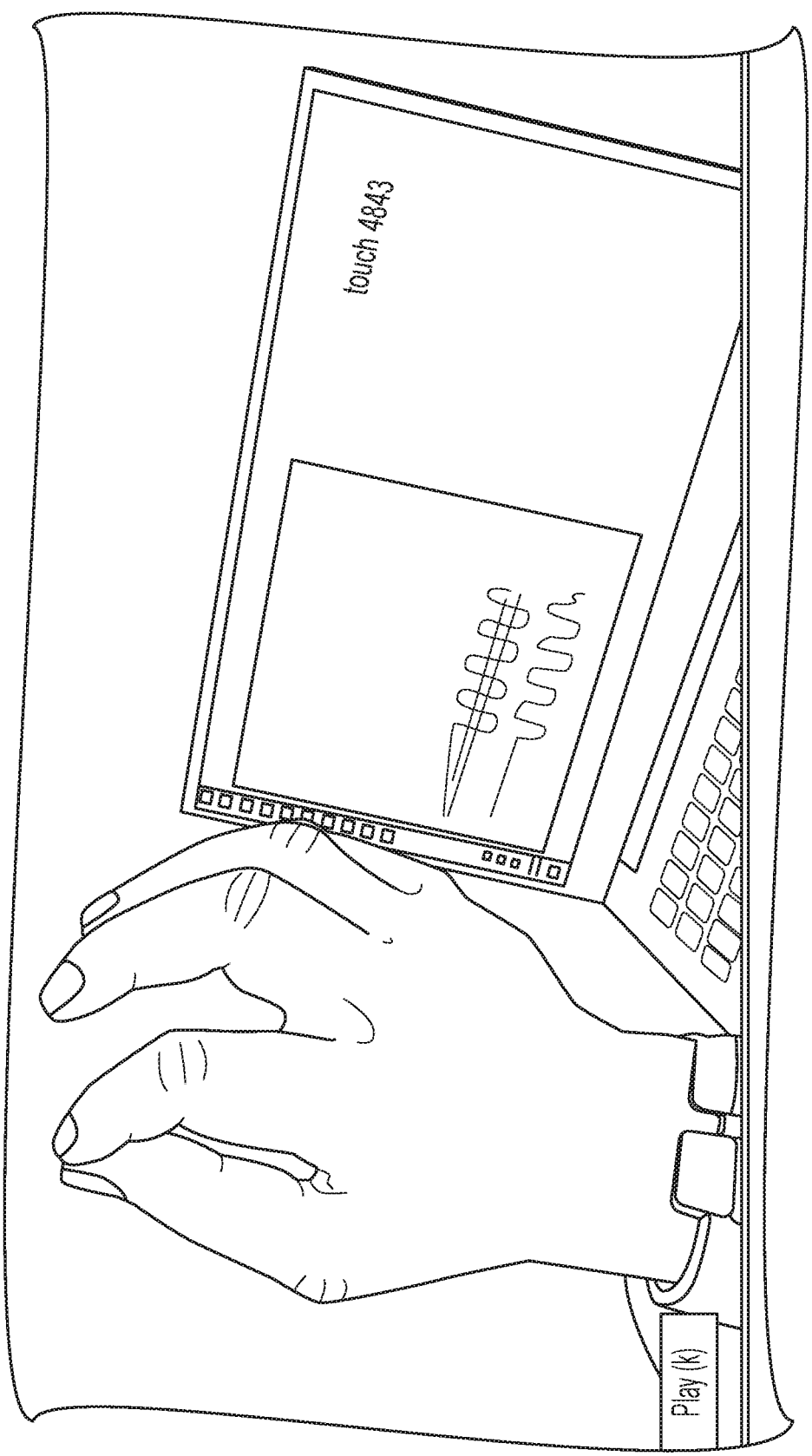
FIG. 4 shows a touch of the fingertips being determined by the sensing system.

FIG. 3 shows a pinch being determined by a sensing system 300. A pinch being the pressing of the fingers together. The transmitting and receiving antennas are located within the housing 305. The transmitting and receiving antennas are placed proximate to the wrist area. The movement and position of physical structure of bones, tendons, veins, arteries, etc. within the wrist area are able to be used in order to determine the motion of the fingers and determine other hand related behaviors. FIG. 3 shows a pinch between the index finger and the thumb being detected and determined by the hand. FIG. 4 shows a touch between the index finger and the thumb being determined by the sensing system. A touch being the contacting of the index finger and thumb without the subsequent pressure.

Figure 5:
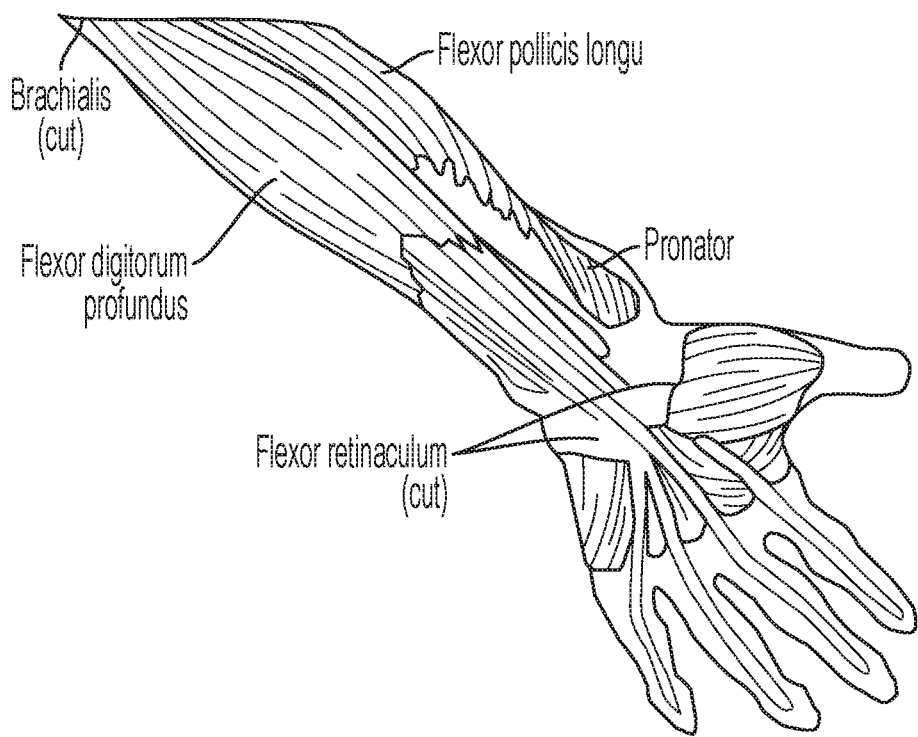
FIG. 5 is a diagram illustrating the musculature of the arm.

FIG. 5 shows a diagram of the musculature in the forearm of a person. The placement of receiving antennas and transmitting antennas in certain areas that correlate to particular movements of the hand and fingers permits better discrimination of the activity that is desired to be determined. The correlation of the activity of the muscle with a particular movement or position is improved. Locating a receiving electrode in an area proximate to the musculature, bone, tendon and/or ligament activity that correlates to the position or motion of the hand that is wished to be discerned improves the ability to determine the sought position or motion.

Due to the different movements of the interior structure of the wrist area, the differences between touch and pinch, shown in FIGS. 3 and 4 are able to be determined via the sensing system. The placement of the transmitting antennas and the receiving antennas on the top portion of the wrist area (i.e. the area shown in the figures where the sensing system is placed) proximate to those muscles that govern the activity of pinch and touch has been determined to be effective for detecting the internal movements within the wrist area that can be correlated to pinch and fingertips touching.

Figure 6:
FIG. 6 shows a touch of a table being determined by the sensing system.
Figure 7:
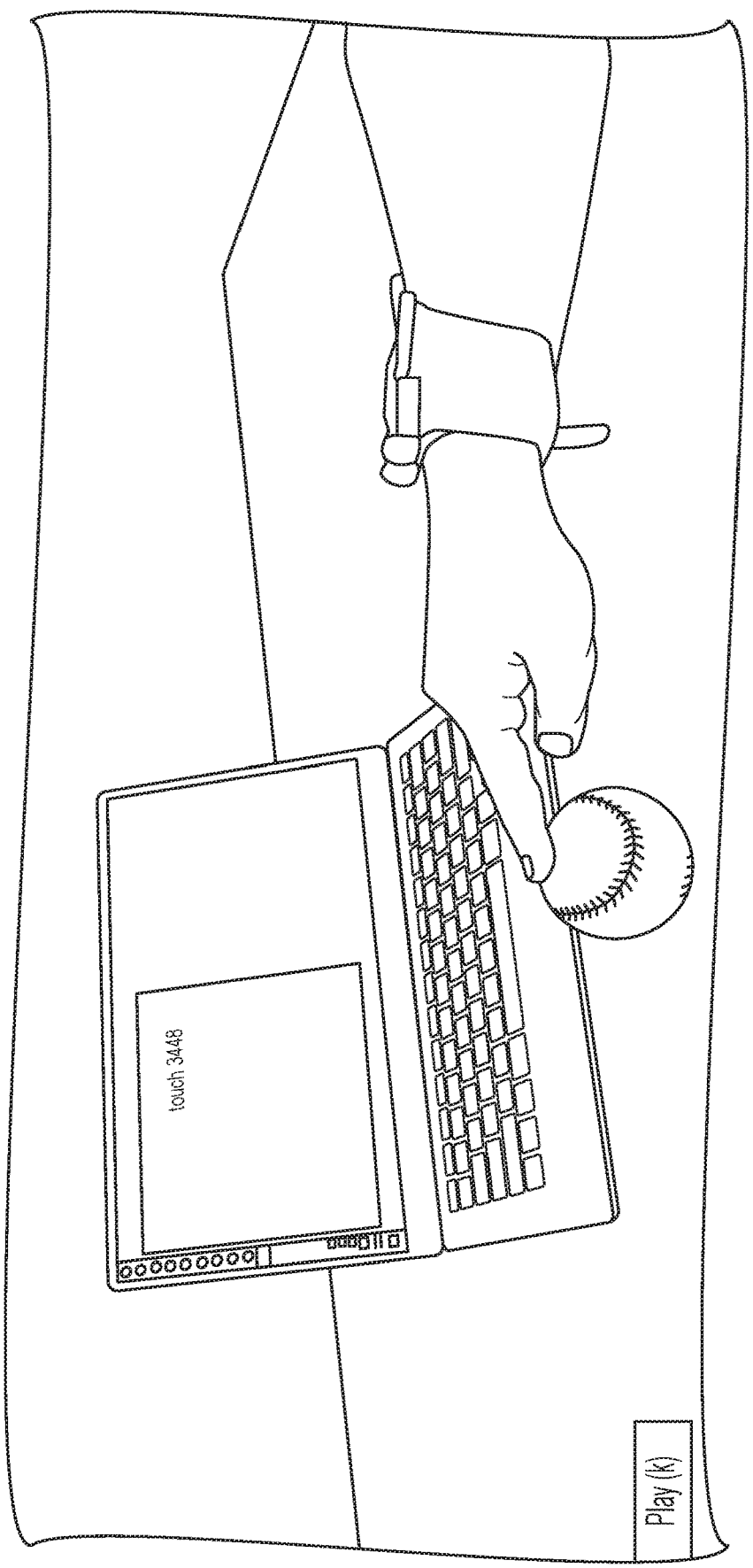
FIG. 7 shows a touch of a baseball being determined by the sensing system.

Additionally, the placement of the sensing system to correlate with musculature, bone, tendon and/or ligament activity that determine other activities of the hands additionally facilitates such determinations. FIG. 6 shows a touch of a table being determined by the sensing system. FIG. 7 shows a touch of a baseball being determined by the sensing system. In both situations the touch event is being determined by contact of the finger with the surface of an object and resultant impact that the touch event has on the underlying physical structure within the wrist area.

While wearables used with various body parts are discussed above, principles discussed above with respect to the various embodiments may be used by one of ordinary skill in view of this disclosure to further implement the sensing system discussed above into other wearables that would benefit from establishing contact.

In an embodiment, the sensing system is implemented in a wearable placed on the ankle. The placement of the sensing system's transmitting antennas and receiving antennas to correlate with musculature, bone, tendon and/or ligament activity that determine activities of the foot provides enhanced measurements of the foot activity. In an embodiment, the sensing system is implemented in a wearable placed on the arm. The placement of the sensing system's transmitting antennas and receiving antennas to correlate with musculature, bone, tendon and/or ligament activity that determine activities associated with the arm provides enhanced measurements of arm activity. In an embodiment, the sensing system is implemented in a sensing device placed on the chest. The placement of the sensing system's transmitting antennas and receiving antennas to correlate with musculature, bone, tendon and/or ligament activity that determine activities associated with the chest (e.g., breathing, heart rate, etc.) provides enhanced measurements of the associated chest activity. In an embodiment, the pressure adaptive sensor system is implemented in a wearable placed on the leg. The placement of the sensing system's transmitting antennas and receiving antennas to correlate with musculature, bone, tendon and/or ligament activity that determine activities associated with the leg provides enhanced measurements of leg activity. In an embodiment, the sensing system is implemented in a wearable placed on the head. The placement of the sensing system's transmitting antennas and receiving antennas to correlate with musculature, bone, tendon and/or ligament activity that determine activities associated with the head provides enhanced measurements of facial activity and head motion. In an embodiment, the sensing system is implemented in a wearable placed on the neck. The placement of the sensing system's transmitting antennas and receiving antennas to correlate with musculature, bone, tendon and/or ligament activity that determine activities associated with the neck provides enhanced measurements of vocalization, breathing, and other associated activities. In an embodiment, the pressure adaptive sensing system is implemented in a wearable placed on the waist. The placement of the sensing system's transmitting antennas and receiving antennas to correlate with musculature, bone, tendon and/or ligament activity that determine activities associated with the waist provide enhanced determination of movement and other associated activities. In an embodiment, the sensing system is implemented in a wearable placed on the hand. The placement of the sensing system's transmitting antennas and receiving antennas to correlate with musculature, bone, tendon and/or ligament activity that determine activities associated with the hand provides enhanced determination of fine hand movement. In an embodiment, the sensing system is implemented in a wearable placed on the foot. The placement of the sensing system's transmitting antennas and receiving antennas to correlate with musculature, bone, tendon and/or ligament activity that determine activities associated with the foot provides enhanced determination of fine foot movement.

An aspect of the disclosure is a sensing system. The sensing system comprises a housing, wherein the housing is adapted to be placed proximate to a body part, at least one transmitting antenna operably located within the housing, wherein the transmitting antenna is adapted to transmit at least one signal; at least one receiving antenna adapted to receive the at least one signal, wherein the receiving antenna is operably located within the housing; a processor adapted to process measurements of signals received by the at least one receiving antenna, wherein processed measurements are used to determine movement proximate to the body part; and wherein placement of the housing positions the at least one transmitting antenna or the at least one receiving antenna in a location wherein processed measurements provide information regarding at least one of musculature, bone, tendon and ligament, wherein the information is used, in part, to determine the movement proximate to the body part.

Another aspect of the disclosure is a method for sensing movement of a body part. The method comprising placing a housing proximate to a body part, wherein operably located within the housing is at least one transmitting antenna adapted to transmit signals; at least one receiving antenna adapted to receive signals, and a processor adapted to process measurements of signals received by the at least one receiving antenna, wherein processed measurements are used to determine movement proximate to the body part; wherein placement of the housing positions the at least one transmitting antenna or the at least one receiving antenna in a location wherein processed measurements provide information regarding at least one of musculature, bone, tendon and ligament, wherein the information is used, in part, to determine the movement proximate to the body part; receiving at least one signal at the at least one receiving antenna; processing the at least one signal received; and determining movement of the body part using the processed at least one signal received.

While the invention has been particularly shown and described with reference to a preferred embodiment thereof, it will be understood by those skilled in the art that various changes in form and details may be made therein without departing from the spirit and scope of the invention.

The invention claimed is:

1. A sensing system comprising:
a housing, wherein the housing is adapted to be placed proximate to a body part,
at least one transmitting antenna operably located within the housing, wherein the transmitting antenna is adapted to transmit at least one signal, wherein the at least one transmitting antenna infuses a plurality of signals to a user, wherein each of the plurality of signals transmitted to the user is orthogonal with respect to each other signal transmitted to the user;
at least one receiving antenna adapted to receive the at least one signal, wherein the receiving antenna is operably located within the housing;
a processor adapted to process measurements of signals received by the at least one receiving antenna, wherein processed measurements are used to determine movement proximate to the body part; and
wherein placement of the housing positions the at least one transmitting antenna or the at least one receiving antenna in a location wherein processed measurements provide information regarding at least one of musculature, bone, tendon and ligament, wherein the information is used, in part, to determine the movement proximate to the body part.

2. The sensing system of claim 1, wherein the body part is a wrist.

3. The sensing system of claim 2, wherein the movement proximate to the body part is a pinch movement.

4. The sensing system of claim 3, wherein the movement proximate to the body is selected from one of a touch or the pinch movement.

5. The sensing system of claim 1, wherein the at least one signal is infused into the body part.

6. The sensing system of claim 1, wherein the at least one receiving antenna is one of a plurality of receiving antennas.

7. The sensing system of claim 1, wherein the at least one transmitting antenna transmits a plurality of signals, each signal transmitted orthogonal to each other signal transmitted during a time interval.

8. The sensing system of claim 1, wherein each signal is frequency orthogonal to each other signal transmitted during a time interval.

9. The sensing system of claim 1, wherein the at least one signal received is processed using a Fast Fourier Transform.

10. The sensing system of claim 1, wherein the movement provides information regarding contact of a part of body with another part of the body or contact of the part of the body with an object.

11. A method for sensing movement of a body part comprising:
placing a housing proximate to a body part, wherein operably located within the housing is at least one transmitting antenna adapted to transmit signals, wherein the at least one transmitting antenna infuses a plurality of signals to a user, wherein each of the plurality of signals transmitted to the user is orthogonal with respect to each other signal transmitted to the user;
at least one receiving antenna adapted to receive signals, and a processor adapted to process measurements of signals received by the at least one receiving antenna, wherein processed measurements are used to determine movement proximate to the body part;
wherein placement of the housing positions the at least one transmitting antenna or the at least one receiving antenna in a location wherein processed measurements provide information regarding at least one of musculature, bone, tendon and ligament, wherein the information is used, in part, to determine the movement proximate to the body part;
receiving at least one signal at the at least one receiving antenna;
processing the at least one signal received; and
determining movement of the body part using the processed at least one signal received.

12. The method of claim 11, wherein the body part is a wrist.

13. The method of claim 12, wherein the movement proximate to the body part is a pinch movement.

14. The method of claim 13, wherein the movement proximate to the body is selected from one of a touch or the pinch movement.

15. The method of claim 11, wherein the at least one signal is infused into the body part.

16. The method of claim 11, wherein the at least one receiving antenna is one of a plurality of receiving antennas.

17. The method of claim 11, wherein the at least one transmitting antenna transmits a plurality of signals, each signal transmitted orthogonal to each other signal transmitted during a time interval.

18. The method of claim 17, wherein each signal is frequency orthogonal to each other signal transmitted during a time interval.

19. The method of claim 11, wherein the at least one signal received is processed using a Fast Fourier Transform.

20. The method of claim 11, wherein the movement provides information regarding contact of a part of body with another part of the body or contact of the part of the body with an object.

* * * * *